(12) United States Patent
Nosker et al.

(10) Patent No.: US 7,955,996 B2
(45) Date of Patent: Jun. 7, 2011

(54) COMPOSITIONS AND METHODS FOR THE PROTECTION OF SUBSTRATES FROM HEAT FLUX AND FIRE

(75) Inventors: Thomas Nosker, Stockton, NJ (US); Jennifer K Lynch, Franklin Park, NJ (US); Mark N Mazar, Piscataway, NJ (US); Patrick L Nosker, Stockton, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

(21) Appl. No.: 12/364,281

(22) Filed: Feb. 2, 2009

(65) Prior Publication Data

US 2009/0221203 A1 Sep. 3, 2009

Related U.S. Application Data

(63) Continuation-in-part of application No. PCT/US2007/074974, filed on Aug. 1, 2007.

(60) Provisional application No. 60/834,696, filed on Aug. 1, 2006, provisional application No. 61/120,142, filed on Dec. 5, 2008.

(51) Int. Cl.
*B32B 27/04* (2006.01)
*B32B 27/12* (2006.01)
*B32B 5/02* (2006.01)

(52) U.S. Cl. ........ 442/136; 428/920; 428/921; 442/172; 442/180

(58) Field of Classification Search .................. 428/920, 428/921; 442/136, 172, 180
See application file for complete search history.

(56) References Cited

U.S. PATENT DOCUMENTS

| 3,634,136 | A | | 1/1972 | French et al. |
| 4,000,108 | A | | 12/1976 | Yokokawa et al. |
| 4,112,179 | A | * | 9/1978 | Maccalous et al. ........... 428/325 |
| 4,286,013 | A | * | 8/1981 | Daroga et al. ................ 442/136 |
| 4,994,317 | A | * | 2/1991 | Dugan et al. .................... 442/72 |
| 5,130,184 | A | | 7/1992 | Ellis |
| 5,582,670 | A | | 12/1996 | Andersen et al. |
| 6,034,155 | A | | 3/2000 | Espeland et al. |
| 6,399,678 | B2 | * | 6/2002 | Frankoski et al. ................. 524/3 |
| 6,623,864 | B1 | * | 9/2003 | Sweet et al. .................. 428/447 |
| 6,933,334 | B2 | | 8/2005 | Cosby et al. |
| 2005/0266219 | A1 | | 12/2005 | Hodgson |
| 2006/0025510 | A1 | | 2/2006 | Dean et al. |
| 2007/0131916 | A1 | | 6/2007 | Horley et al. |

FOREIGN PATENT DOCUMENTS

WO 2008016975 A2 2/2008
* cited by examiner

*Primary Examiner* — Norca L Torres-Velazquez
(74) *Attorney, Agent, or Firm* — Fox Rothschild LLP

(57) ABSTRACT

A flame or heat flux protective coating composition, which includes a dispersion of fiberglass, hollow glass spheres, or a combination of both in silicone. A flame or heat flux protective sheet, which includes hollow glass spheres dispersed in silicone in a sheet form or fiberglass and silicone in a sheet form, wherein the fiberglass is dispersed in the silicone or the fiberglass is a woven cloth coated with the silicone is also presented. Articles incorporating the flame or heat flux protective coating or sheet form and methods for coating an article with the flame or heat flux protective coating composition are also presented.

10 Claims, 9 Drawing Sheets

| Product | Description/Components | Cooling Mechanism | Flame Test | Low T Flexural Test |
|---|---|---|---|---|
| A | Epoxy Resin: 4% Chlorophosphate in the (S) catalyst | Intumescent | Failed | Failed |
| B | Epoxy Resin: 4% Chlorophosphate in the (H) catalyst | Intumescent | Failed | Failed |
| C | Passive fire barrier coating, Water-based latex paint, No halogenated compounds | Intumescent | Failed | Failed |
| D | Water-based latex paint: Titanium Dioxide, Melamine, Vinyl Acetate/Acrylic Copolymer, Ammonium Polyphosphate, Water, No halogenated compounds | Intumescent | Passed | Failed |
| E | Water-based: Titanium Dioxide, Melamine, Vinyl Acetate Latex, DiPentaerythritol, Ammonium Polyphosphate, Water, Aluminum Oxide, Silicon Dioxide | Intumescent | Passed | Failed |
| F | Flexible, aqueous acrylic co-mixed with organic phosphinates, organo-cationic nano-dimensional clay, talc, zinc borate, and water, No halogenated compounds | Intumescent | Failed | Failed |
| G | Flexible aqueous acrylic and an intumescent char former composed of graphite carbon nano-fibers, No halogenated compounds | Intumescent char former | Failed | Failed |
| H | Silicone based coating, No halogenated compounds | Intumescent | Failed | Passed |
| 4 % | 4 % fiberglass in silicone matrix | Emissivity | Passed | Passed |
| 6 % | 6 % fiberglass in silicone matrix | Emissivity | Failed | Passed |
| 8 % | 8 % fiberglass in silicone matrix | Emissivity | Passed | Passed |
| 10 % | 10 % fiberglass in silicone matrix | Emissivity | Passed | Passed |
| 12 % | 12 % fiberglass in silicone matrix | Emissivity | Passed | Passed |
| 14 % | 14 % fiberglass in silicone matrix | Emissivity | Passed | Passed |
| 0 % | 0 % Hollow Glass Microspheres in silicone matrix | Emissivity | Passed | Passed |
| 0.1 % | 0.1 % Hollow Glass Microspheres in silicone matrix | Emissivity | Passed | Passed |
| 1 % | 1 % Hollow Glass Microspheres in silicone matrix | Emissivity | Passed | Passed |
| 3 % | 3 % Hollow Glass Microspheres in silicone matrix | Emissivity | Passed | Passed |
| 5 % | 5 % Hollow Glass Microspheres in silicone matrix | Emissivity | Passed | Passed |
| 10 % | 10 % Hollow Glass Microspheres in silicone matrix | Emissivity | Passed | Passed |
| 15 % | 15 % Hollow Glass Microspheres in silicone matrix | Emissivity | Passed | Passed |
| 20 % | 20 % Hollow Glass Microspheres in silicone matrix | Emissivity | Passed | Passed |
| 30 % | 30 % Hollow Glass Microspheres in silicone matrix | Emissivity | Passed | Passed |
| 40 % | 40 % Hollow Glass Microspheres in silicone matrix | Emissivity | Passed | Passed |

Figure 4.

COMPOSITIONS AND METHODS FOR THE PROTECTION OF SUBSTRATES FROM HEAT FLUX AND FIRE

CROSS REFERENCE TO RELATED APPLICATIONS

This application claims priority under 35 U.S.C. §119(e) to U.S. Provisional Application Ser. No. 61/120,142, filed Dec. 5, 2008; and this application is a continuation-in-part of International Application No. PCT/US2007/074974, filed Aug. 1, 2007, which claims priority under 35 U.S.C. §119(e) to U.S. Provisional Application Ser. No. 60/834,696, filed on Aug. 1, 2006, the disclosures of all of which are incorporated herein by reference.

STATEMENT REGARDING FEDERALLY SPONSORED RESEARCH

The U.S. Government has a paid-up license in this invention and the right in limited circumstances to require the patent owner to license others on reasonable terms as provided for by the terms of grant W15QKN-06-P-0262 awarded by the United States Army.

BACKGROUND OF THE INVENTION

Thermal barrier coatings (TBC) insulate and protect a substrate from prolonged or excessive heat flux and enable the substrate material to retain its mechanical property integrity during service. Selection of the type of system and its components depends upon the application. Heat may be dissipated away from a substrate by several methods, including heat sinks, active cooling, transpiration cooling, radiation cooling, and intumescences.

A need exists for a coating that is able to protect a substrate from exposure to high temperatures and possesses a high strain to failure (i.e. toughness) and adhesion capabilities under harsh, cold temperatures while subject to high mechanical stresses.

SUMMARY OF THE INVENTION

The present invention is directed to a flame or heat flux protective coating composition, which includes a dispersion of fiberglass, hollow glass spheres, or a combination of both, in silicone. Also presented is a flame or heat flux protective sheet, which includes fiberglass, hollow glass spheres, or a combination of both and silicone in a sheet form, wherein the fiberglass and/or hollow glass spheres are dispersed in the silicone or the fiberglass is a woven cloth coated with the silicone. A method for coating an article with a flame or heat flux protective coating and articles incorporating the flame or heat flux protective coating or sheet form are also presented.

BRIEF DESCRIPTION OF THE DRAWINGS

FIG. 4 is a table setting forth descriptions of the tested coatings;

DETAILED DESCRIPTION OF THE INVENTION

Figure 1:
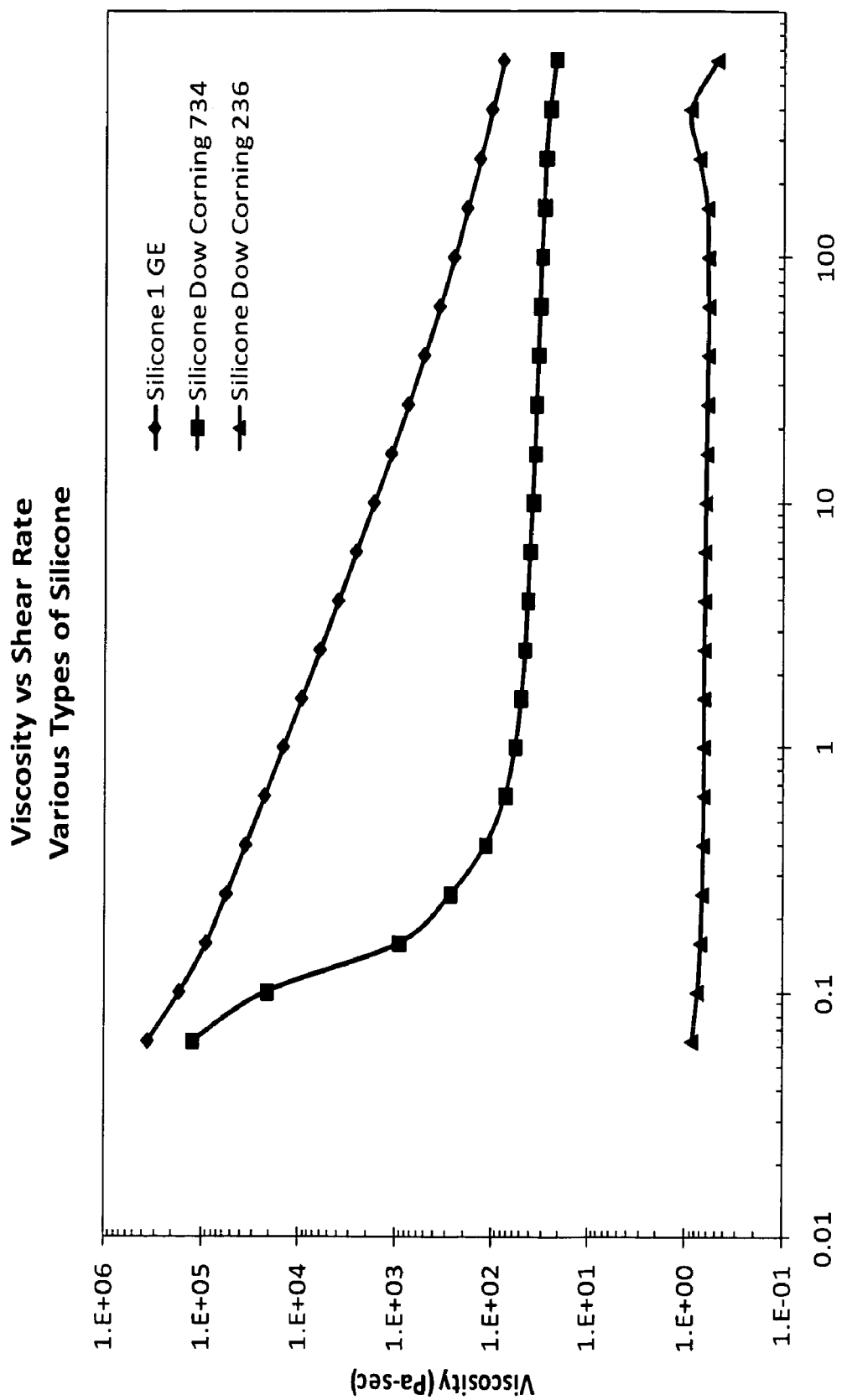
FIG. 1 is a graph of viscosity versus shear rate for various silicone products.

The present invention includes a "glass component," which is defined to include fiberglass and/or hollow glass spheres. The glass component imparts high emissivity to the composition of the present invention. Emissivity is a material's ability to absorb and radiate energy as a function of its temperature and is defined herein as the ratio of the total energy radiated by a material to a black body at the same temperature. A black body absorbs all electromagnetic radiation and is an ideal radiator with an emissivity of 1. The emissivities of all non-black body objects are less than one and are determined by the object's temperature, surface characteristics, geometric shape and size, and chemical composition. In order to dissipate heat, high emissivity values close to one are desirable. The emissivity of glass ranges from 0.87-0.95.

The glass component also provides the coating composition with relatively low heat conductivity and, thus, a high thermal insulation value. For example, one end of a strand of fiberglass is able to radiate heat away from a coated substrate when subjected to high temperatures, while the other end of the same strand insulates the substrate from the radiated heat. In another example, exposure of hollow glass spheres to high temperatures causes the spheres to melt together to form a protective layer above the coated substrate.

The glass component is present in an amount suitable to promote effective radiation cooling when exposed to heat. In one embodiment, fiberglass is present in an amount from about 4% to about 14% by weight of the composition. Preferably, the amount of fiberglass is from about 8% to about 14% by weight of the composition, more preferably from about 8% to about 12% by weight of the composition.

In another embodiment, hollow glass spheres are present in an amount from about 0.1% to about 40% by weight of the composition. The amount of hollow glass spheres affects the coating's viscosity and may depend upon the desired method of application. For example, a preferred amount of hollow glass spheres in a coating to be applied by spraying is from about 0.25% to about 20% by weight of the composition. A preferred amount of hollow glass spheres in a coating to be applied by a dipping method is from about 5% to about 30% by weight of the composition. The amount of hollow glass spheres in a coating to be applied with a foam brush is up to about 40% by weight of the composition.

The fiberglass can have any suitable fiber length and diameter. The fiberglass can also include fibers having a mixture of suitable lengths and diameters. Preferably, the fiber length ranges from about 1 mm to about 20 mm. A preferred fiber diameter ranges from about 6 μm to about 19 μm. Optionally, at least a portion of sizing material is removed from the fiberglass prior to combining with the silicone component.

The hollow glass spheres can have any suitable diameter or mixture of suitable diameters. A preferred diameter for the hollow glass spheres ranges from about 5 μm to about 30 μm, with about 18 μm being the most preferred diameter.

The glass component can have any suitable aspect ratio. In one embodiment, the aspect ratio of the glass component is from about 1:1 to about 20:1.

The silicone component provides the coating with mechanical flexibility and thermal stability over a broad temperature range (e.g. −110-400° F.). Additionally, the decomposition of the silicone component at high temperatures (e.g. greater than 400° F.) into silicon dioxide and silicon oxide absorbs a large amount of energy from the heat source. Furthermore, as a result of silicone degradation, large surface areas of the glass component are exposed. The matted network of exposed fiberglass or exposed hollow glass spheres increases the coating's degree of radiative cooling and serves as insulation by remaining grounded in the cooler under layers of silicone near the protected substrate surface.

Preferably, the silicone component includes dimethylsiloxane and polydimethylsiloxane.

For application to thermoplastic substrates, low viscosity silicones with solvents are preferred because they obviate the need to add material that enhances the bond between the silicone and the substrate, require less energy to mix than higher viscosity silicones, and are easier to apply to the substrate. For example, Dow Corning® 236 Dispersion was observed to adhere well to polyethylene and polystyrene. When using thicker silicones (e.g. viscosity greater than 100 Pa·s and shear rate between about 1 and about 1000 $s^{-1}$) with a lower volatile organic compound content (e.g. less than 1% VOC content) the addition of polyurethane enhances bonding to the surface of a thermoplastic substrate. For example, mixtures of silicone rubber and up to 70% polyurethane performed well during a flame test. If high toughness at low temperatures is required, the maximum allowable concentration of polyurethane is 40% in order to pass a low temperature flexural test in which the coated substrate is bent around a 0.64 cm mandrel to 180° at −79° C.

The glass component and silicone are mixed or blended utilizing techniques suitable for the viscosity of the silicone in the coating composition. Blends that include a higher viscosity silicone can be prepared with more powerful blending means (e.g. a paddle mixer, single or twin screw mixer, a Banbury mixer, and the like). Blends that include a lower viscosity silicone can also be prepared with the previously described blending means or by hand mixing in a container with a stirring means or shaking the mixture in a closed container.

Another aspect of the current invention includes a method for applying a flame or heat flux protective coating composition to at least a portion of an article, wherein the composition includes a fiberglass dispersion in silicone. In a preferred embodiment, the coating is applied by brushing onto a substrate. Medium viscosity silicones (e.g. Dow Corning® 734 Flowable Sealant) are preferred when the coating is applied by brush. In another embodiment, the coating is applied by dipping a substrate into the coating composition. In yet another embodiment, the coating is applied by spraying the coating composition onto a substrate. For spray coating applications, lower viscosity silicone rubbers (e.g. Dow Corning® 236 Dispersion) are preferred. When applying the coating, an even layer is not critical but the coating should be thick enough to obstruct vision of the underlying surface. For thicker coatings (e.g. for fire blocks), a high viscosity silicone (e.g. Silicone 1® (GE)) is preferred.

Another aspect of the current invention includes an article, wherein at least a portion is coated with a composition, which includes a fiberglass dispersion, a dispersion of hollow glass spheres, or a combination of both in silicone.

Suitable substrates for the coated article include, for example, thermoplastics, thermoplastic composites, polyethylene, wood, stone, metal (e.g. steel), ceramics, glass, masonry materials (e.g. brick, marble, granite, travertine, limestone, concrete block, glass block, tile, etc.), and the like. For example, U.S. Pat. Nos. 6,191,228, 5,951,940, 5,916,932, 5,789,477, and 5,298,214 disclose structural recycled plastic lumber composites made from post-consumer and post-industrial plastics, in which polyolefins are blended with polystyrene or a thermoplastic coated fiber material such as fiberglass. The disclosures of all five patents are incorporated herein by reference.

The coated article can have any shape or form, for example, a round cross-section, a rectangular cross-section, an hourglass cross-section, a sheet form, or a combination thereof. Exemplary forms for plastic composites are disclosed in U.S. Application No. 60/486,205 filed Jul. 8, 2003, U.S. Application No. 60/683,115 filed May 19, 2005, U.S. application Ser. No. 10/563,883 filed Jan. 9, 2006, and International Application No. PCT/US06/19311 filed May 19, 2006. The disclosures of all of which are incorporated herein by reference. In one embodiment, the article is an L-Beam, I-Beam, a C-Beam, a T-Beam, or a combination thereof.

Exemplary articles suitable for coating with the composition of the present invention include, but are not limited to, steel ammunition boxes, railroad ties, plastic piping, lumber, sheet piling, boat hulls, pick-up truck beds, gasoline canisters, fuel tanks in automobiles, airplanes, ships, and submarines, steel skyscraper structures, bridges, areas near high temperature operating components, such as ignition champers, infrastructure, for example, building support structures and cables in suspension bridges, high-pressure storage tanks, and the like.

The composition of the present invention can also be incorporated into a sheet form. For example, the silicone and glass components can be combined in an extruder and extruded into a sheet die. In another embodiment, a woven fiberglass cloth is coated with the silicone component.

Exemplary applications for the sheet forms of the present invention include, but are not limited to, fabrics, for example, fire protective clothing and blankets, and sheets applied to any of the articles mentioned above as being suitable for coating with the composition of the present invention.

The following non-limiting examples set forth herein below illustrate certain aspects of the invention.

EXAMPLES

Example 1

Viscosity Versus Shear Rate of Silicone

The viscosity versus shear rate of three types of silicone (Silicone 1® (GE), Dow Corning® 236 Dispersion, and Dow Corning® 734 Flowable Sealant) is presented in FIG. 1. Viscosity and shear rate were determined using a TA Instruments AR-2000 rheometer. The compositions were subject to a frequency sweep test from 100 to 0.01 Hz at a constant temperature of 23° C. and constant % strain. The % strain value was selected within the linear viscoelastic region, determined for each mixture by a stress sweep test over a range of 1 to 10,000 μNm at a constant frequency of 1 Hz and constant temperature of 23° C.

The highest viscosity silicone is Silicone 1® (GE) followed by Dow Corning® 734 Flowable Sealant and Dow Corning® 236 Dispersion. Dow Corning® 2360 Dispersion possesses a significantly lower viscosity than the other two types of silicone.

Example 2

Viscosity Versus Shear Rate of Silicone Containing Fiberglass or Hollow Glass Spheres Rheology experiments were performed to determine viscosity of the coating at various concentrations of glass and with various types of silicone. Compositions were prepared by blending the glass component and silicone. Viscosity and shear rate experiments were conducted as set forth in Example 1.

Figure 2:
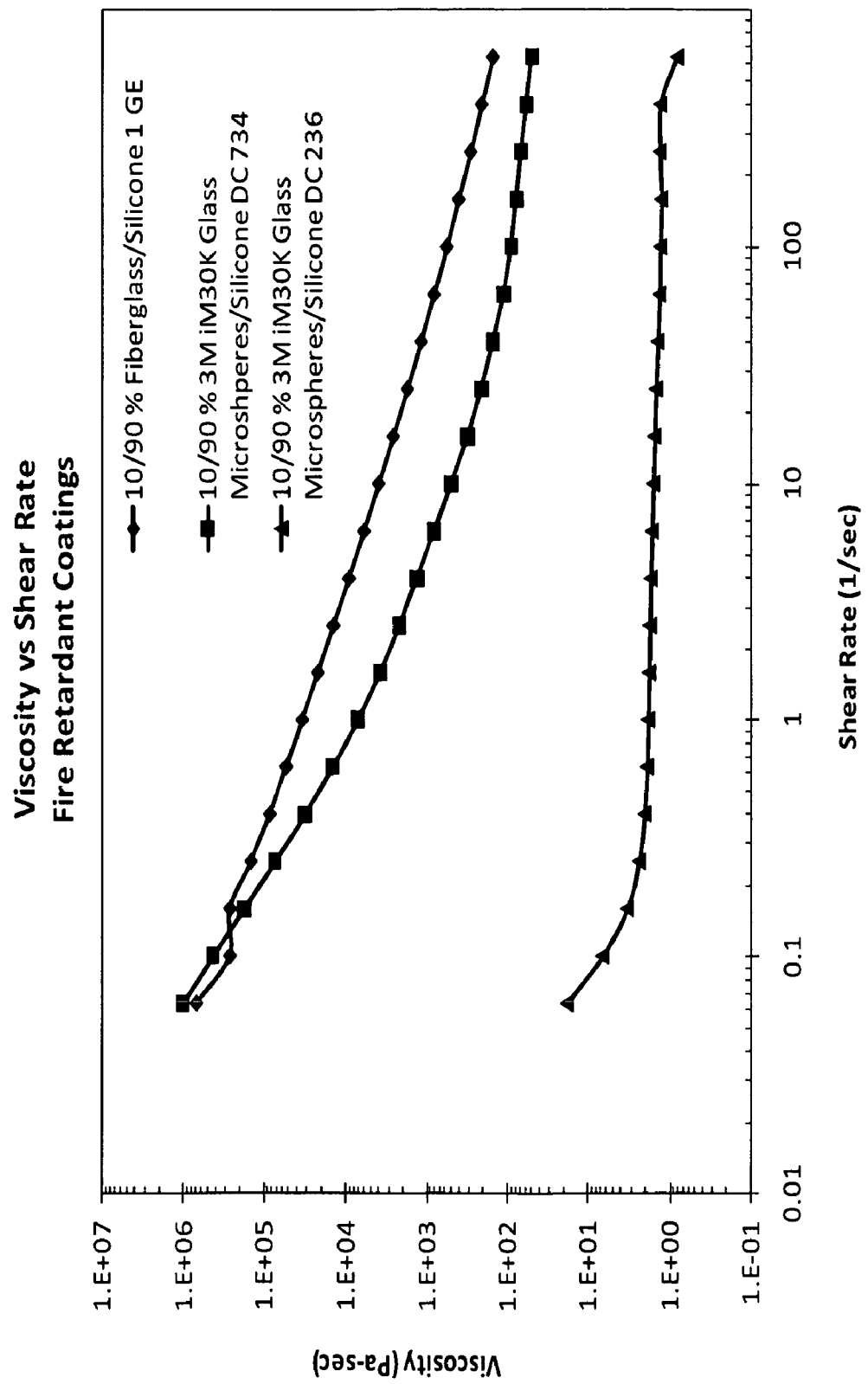
FIG. 2 is a graph of viscosity versus shear rate for three glass component/silicone coatings.

The viscosity versus shear rate of three types of fire retardant coatings is shown in FIG. 2 for comparison, including 10/90% Fiberglass/Silicone 1®, 10/90% 3M™ iM30K Hi-Strength Glass Bubbles/Dow Corning® 734 Flowable Sealant, and 10/90% 3M™ iM30K Hi-Strength Glass Bubbles/Dow Corning® 236 Dispersion. This viscosity of the 10/90% 3M™ iM30K Hi-Strength Glass Bubbles/Dow Corning® 236 Dispersion fire retardant coating is significantly lower than that of 10/90% Fiberglass/Silicone 1® and 10/90% 3M™ iM30K Hi-Strength Glass Bubbles/Dow Corning® 734 Flowable Sealant.

Coating compositions containing 3M™ iM30K Hi-Strength Glass Bubbles (e.g. hollow glass microspheres) at 0, 10, 20, 30, and 40% by weight of the total composition in Dow Corning® 236 Dispersion were prepared by blending the microspheres and silicone.

Figure 3:
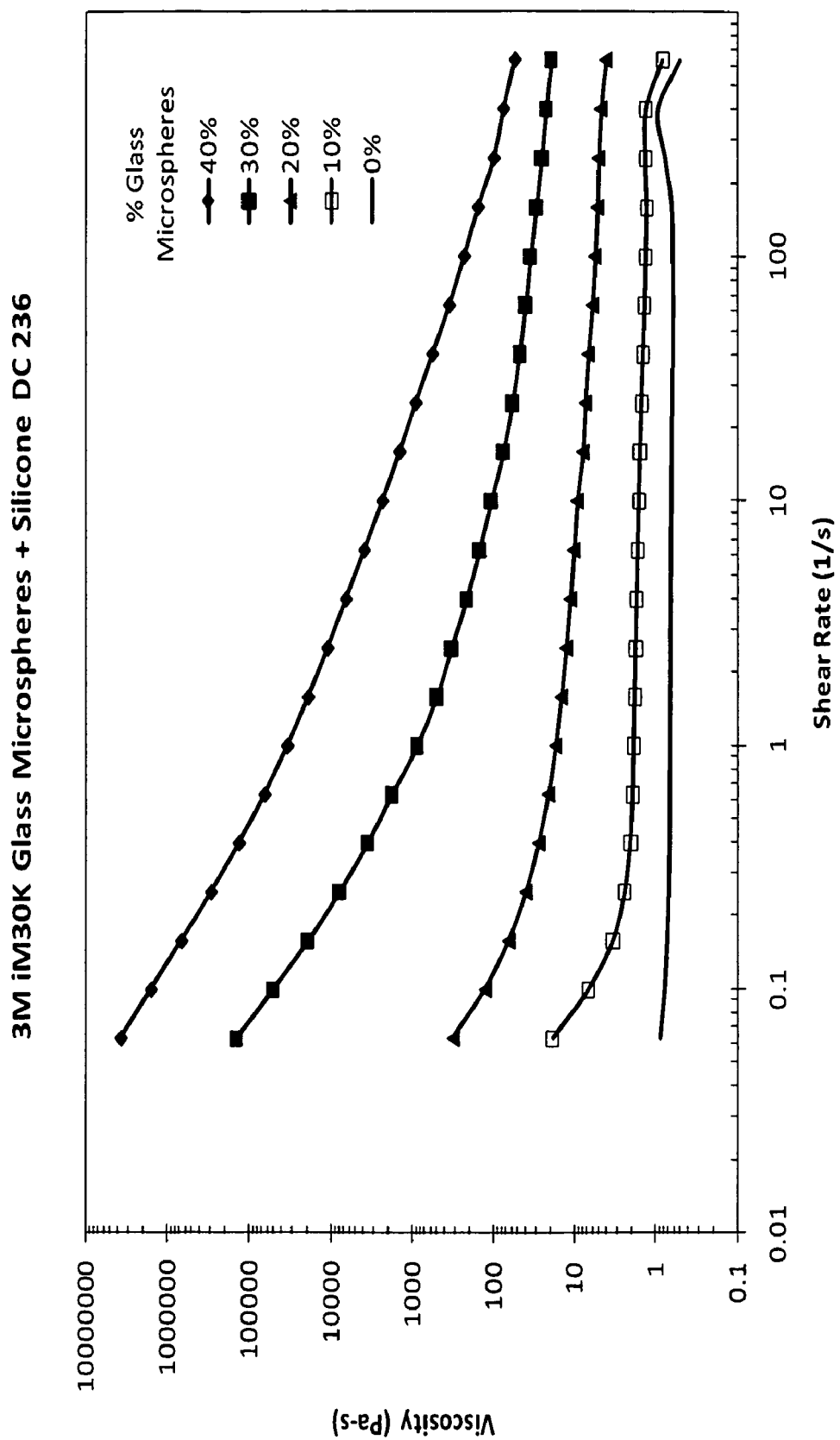
FIG. 3 is a graph of viscosity versus shear rate for various hollow glass sphere/silicone coatings.
Figure 5:
FIG. 5 is a graph of temperature versus time for the flame test for fiberglass/silicone coatings.

The viscosity versus shear rate of the coating containing 3M™ iM30K Hi-Strength Glass Bubbles in Dow Corning® 236 Dispersion is shown at various percentages of glass microspheres, including 0, 10, 20, 30, and 40% glass in FIG. 3. The coating's viscosity increases with the addition of glass microspheres.

Example 3

Sample Preparation (Fiberglass in Silicone)

Blends of 4, 6, 8, 10, 12, and 14% by weight fiberglass in silicone, with trace amounts of silicone oil, were prepared. The components were blended in a mixer and applied to a steel coupon with a putty knife targeting a thickness of 1.6 mm or less. The fiberglass/silicone coatings were compared against seven commercial products (FIG. 4) in a low temperature flexural test and a direct high temperature flame test. The coatings were applied to standard 76 by 152 by 0.735 mm steel coupons. Three specimens per sample, or coating type, were tested for both experiments.

Example 4

Sample Preparation (Hollow Glass Spheres in Silicone)

Blends of 0.1, 1, 3, 5, 10, 15, 20, 30, and 40% by weight 3M™ iM30K Hi-Strength Glass Bubbles in Dow Corning® 236 Dispersion were prepared. The components were blended in a mixer and applied to standard 76 by 152 by 0.735 mm steel coupons using one of three methods targeting a thickness of 1.6 mm or less: painted with a foam brush, applied with a plastic putty knife, or dipped.

Example 5

Low Temperature Flexural Test

Coated steel plates were annealed in dry ice, approximately −79° C., for at least 15 minutes followed by bending around a 0.64 cm mandrel to an angle of 180°. During the test, photographs were taken of each specimen at 30°, 90°, and 180° of bending. Visual observation provided information about a coating's response to thermal shock when bonded to a steel substrate and indicated the type and severity of surface damage incurred due to bending at low temperatures. A successful coating did not have surface damage after testing.

During bending, the coating stretches to accommodate the substrate's new, larger surface area. The surface of the coating is in tension and receives the highest percent strain during bending. Thus, crack formation is initiated at the coating surface. Failure of the coating is indicated by crack development and propagation in the coating and delamination. Common modes of failure included tiny crack formation parallel to the bending axis in the deformation region, large cracks that caused pieces of the coating to detach and expose the substrate, and some brittle failure. In some cases, the coating delaminated as well. These types of surface failure indicate a coating with low strain to failure at low temperatures that will detach or delaminate, expose the substrate, and create a point source of radiative heat.

As indicated in FIG. 4, Products A, B, C, D, E, and G failed the low temperature flexural test due to crack formation. At more severe bending angles, the initial cracks simply propagated, caused pieces of the coating to detach from the substrate, and/or the coating delaminated. In the Product C sample, 2 of 3 specimens passed, and in the Product G sample, 1 of 3 specimens passed. However, all specimens per sample must pass the test in order to be considered successful. Product H, a silicone-based coating, is the only commercial coating tested that did not suffer any surface damage and passed the low temperature flexural test. The fiberglass/silicone composite coating did not suffer any surface damage, remained adhered to the substrate during bending, and passed the low temperature bend test. The coating thickness does not appear to significantly affect low temperature performance. For Product E and the fiberglass/silicone composite, specimens were prepared at various thicknesses. All Product E specimens failed while all fiberglass/silicone composite specimens passed.

All compositions of 3M™ iM30K Hi-Strength Glass Bubbles in Dow Corning® 236 Dispersion successfully passed the low temperature flexural test (FIG. 4).

Example 6

Flame Test

A flame produced by a propane torch was applied normal to the coated side of a specimen. An IR sensor (Omega OS550 Series Infrared Industrial Pyrometer) was aligned on the same axis as the flame and measured temperature as a function of time on the back side of the vertical steel coupon. The inner cone length of the flame was adjusted to 3.175 cm, and the tip of the inner cone, the hottest part of the flame, was positioned directly on the sample's surface 2.54 cm above the bottom edge and at the center across the sample width. This configuration delivered worst case scenario results for high temperature direct point heating. The adiabatic flame temperature of propane in air is approximately 1,927° C.+/−38° C. The flame was applied for a total duration of ten minutes. A coating is considered to fail the flame test if the maximum temperature detected by the IR sensor exceeds 316° C. The maximum temperature reached for each coating was compared against the control specimen, an uncoated steel plate, as a point of reference.

Figure 6:
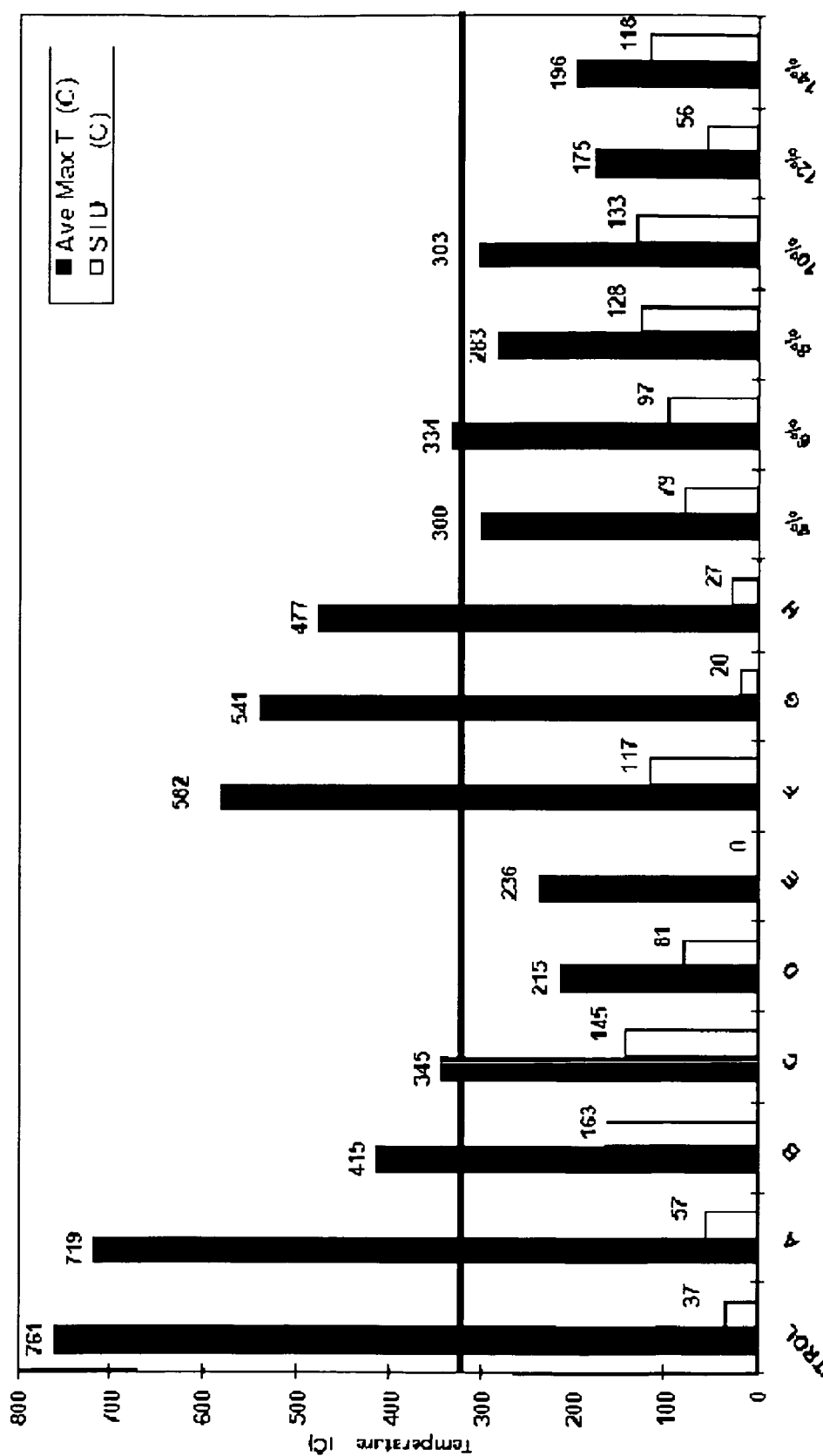
FIG. 6 is a graph depicting average flame test results for fiberglass/silicone coatings.

The flame test results are presented graphically in FIGS. 4-9. The average temperature versus time data collected during the flame test for each sample (i.e. fiberglass/silicone coating and commercial product) is presented in FIG. 5, and the average maximum temperature and standard deviation per sample in FIG. 6. The 12% fiberglass/silicone coating maintained the lowest maximum temperature of all of the coatings. In FIG. 6, the black horizontal line signifies the pass/fail temperature limit of 316° C. and delineates the coatings that passed the flame test from those that did not (e.g. coatings with a maximum temperature below the line pass, while those above the line fail).

Coatings with a maximum temperature below the limit were Products D and E and the fiberglass/silicone composite coatings (excluding the 6% fiberglass composition) (FIG. 4). The average maximum temperatures of Products A, B, C, F, G, and H exceeded the limit, thus failing the test.

Figure 7:
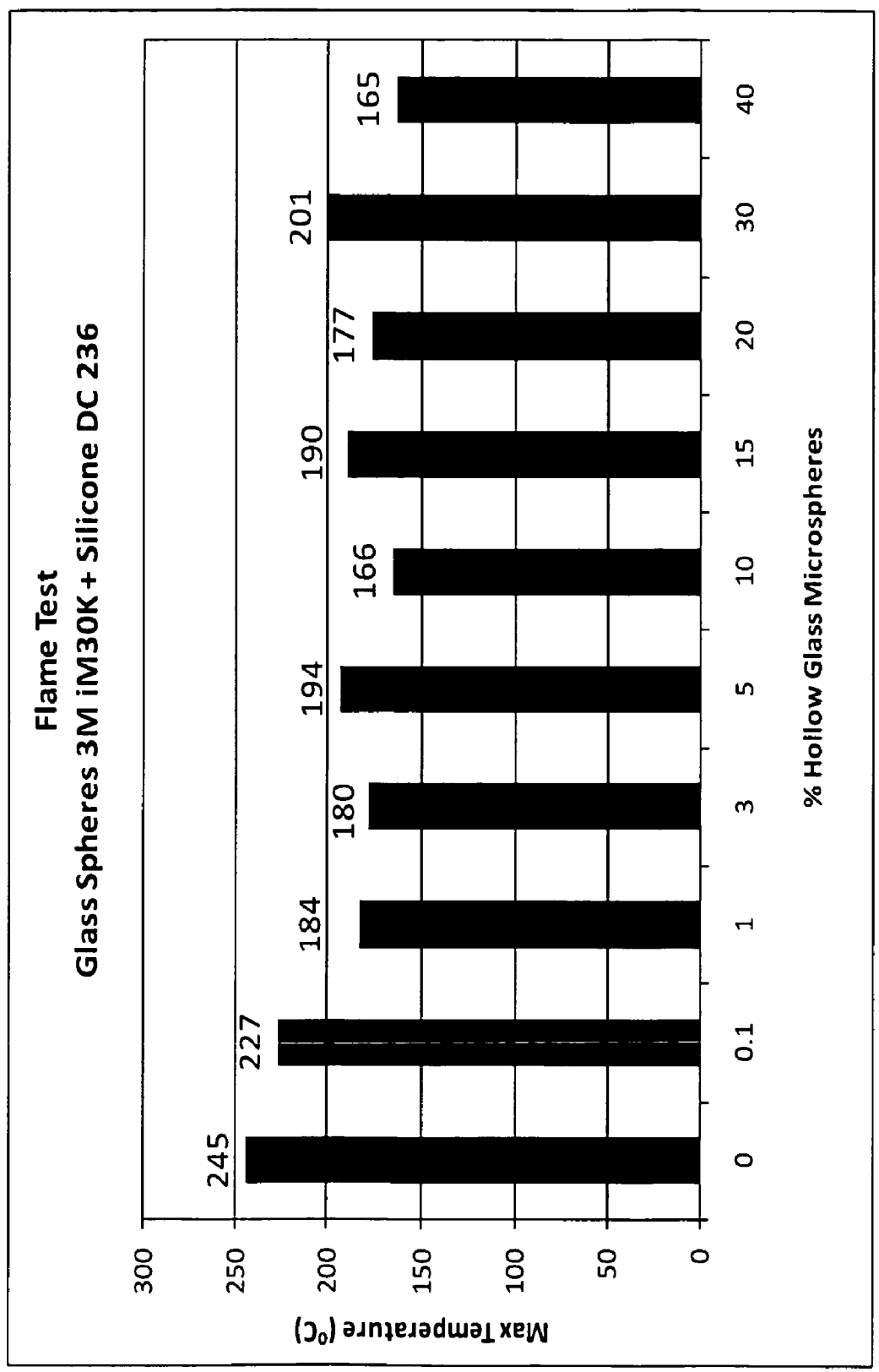
FIG. 7 is a graph depicting flame test results for hollow glass sphere/silicone coatings.

The maximum temperature for the coatings containing 3M™ iM30K Hi-Strength Glass Bubbles in Dow Corning® 236 Dispersion obtained during the 10-minute flame test is shown in FIG. 7. Coating thickness ranges from 0.25-0.8 mm for these flame test specimens. The maximum temperature achieved drops by 100° C. with the addition of the hollow glass microspheres. Thicker coatings provide increased protection and would result in a lower maximum temperature.

Figure 8:
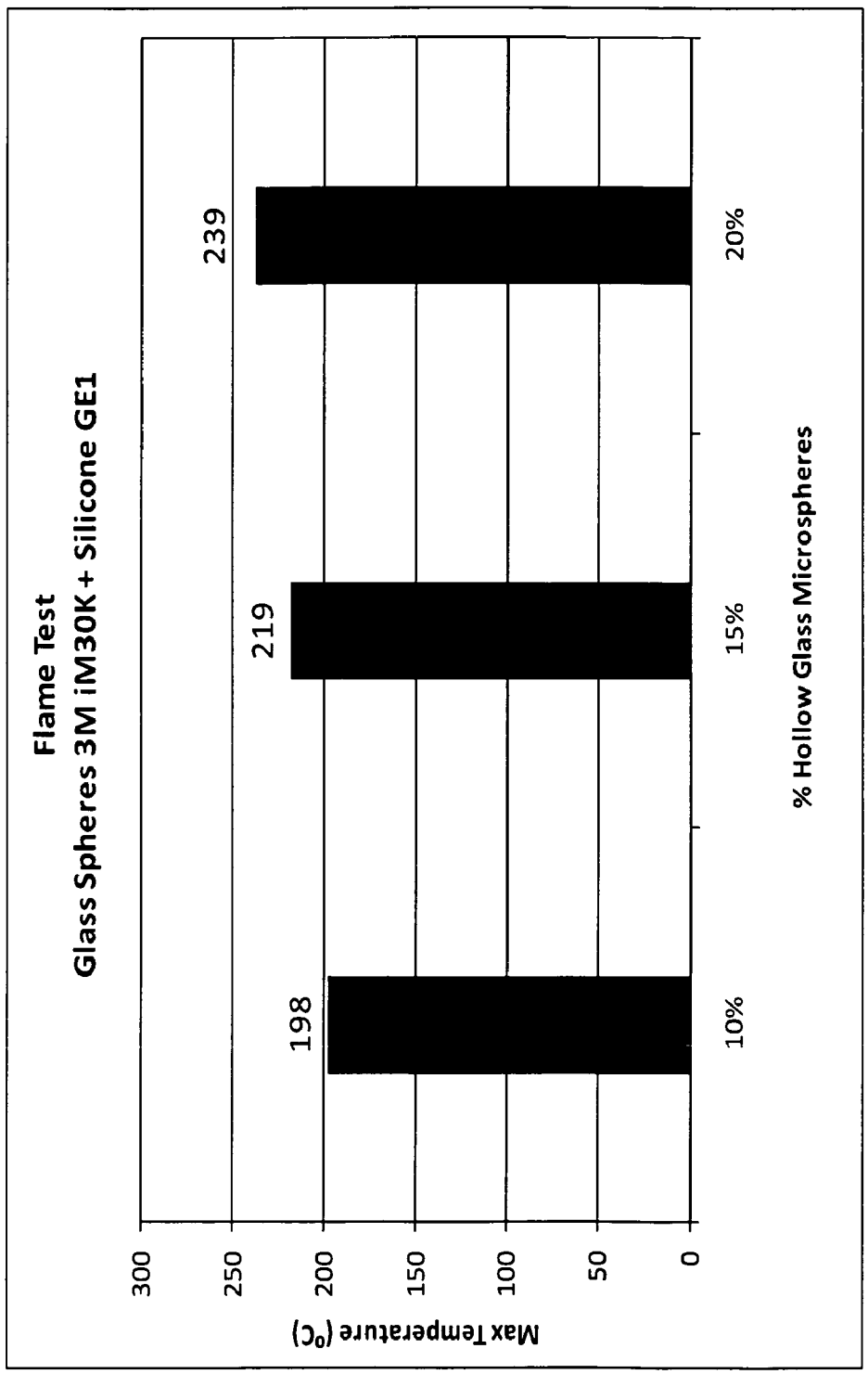
FIG. 8 is a graph depicting flame test results for hollow glass sphere/silicone coatings.

The maximum temperature for the coatings containing 10, 15, and 20% by weight 3M™ iM30K Hi-Strength Glass Bubbles in a matrix of Silicone 1® obtained during the 10-minute flame test is shown in FIG. 8. Coating thickness ranges from 1.14-1.19 mm for these flame test specimens.

Figure 9:
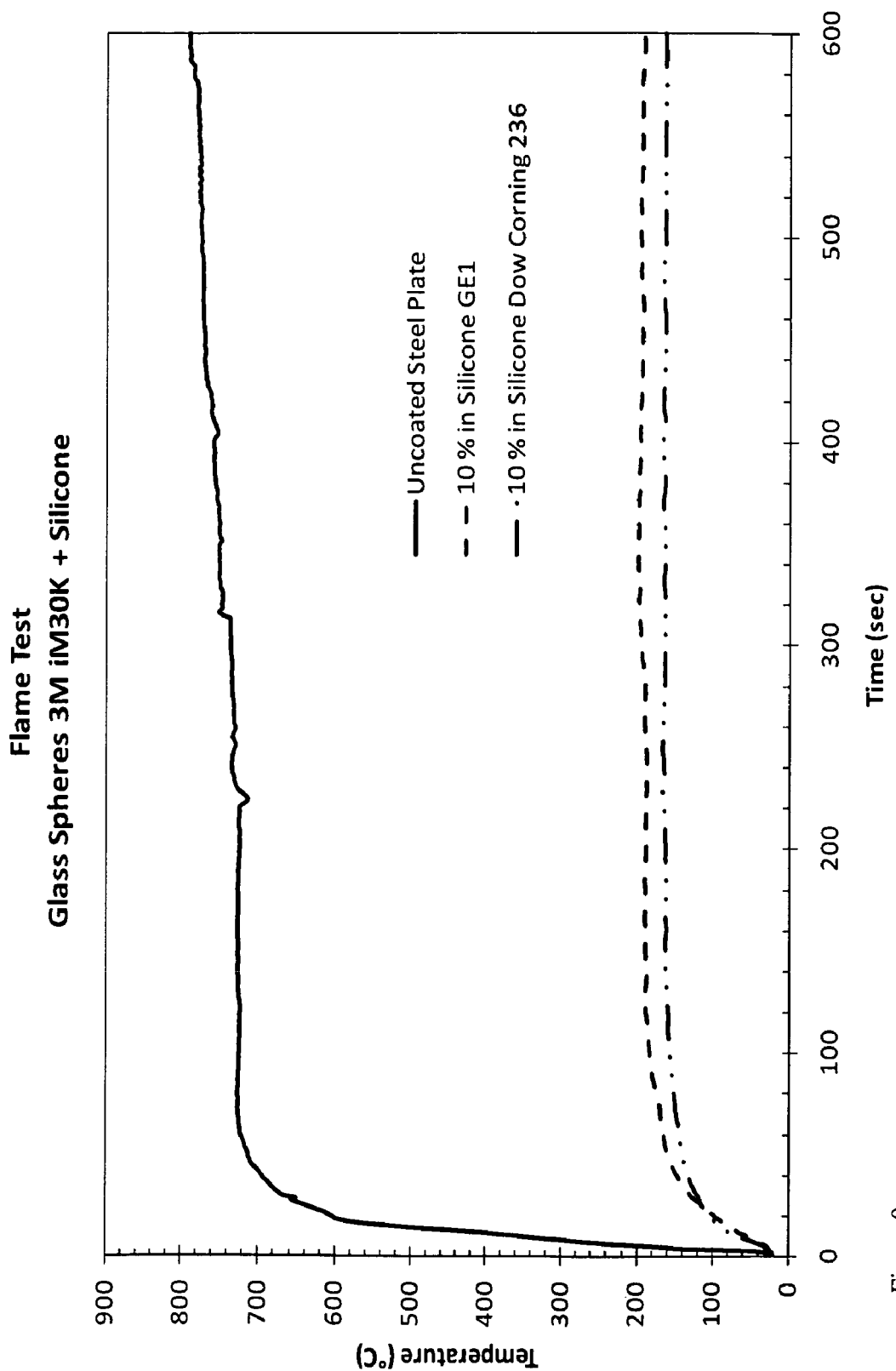
FIG. 9 is a graph depicting a comparison of flame test results between an uncoated steel plate and plates coated with hollow glass sphere/silicone coatings.

FIG. 9 presents a comparison of the 10-minute flame test between Dow Corning® 236 Dispersion and Silicone 1® containing 10% 3M™ iM30K Hi-Strength Glass Bubbles in each silicone matrix. Flame test results of an uncoated steel coupon are also provided. Flame testing indicates that various fully-cured silicone rubbers essentially performed the same. Thus, any silicone rubber may be used depending on the desired application method.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and script of the invention, and all such variations are intended to be included within the scope of the following claims.

What is claimed is:

1. A flame or heat flux protective coating composition with a sprayable viscosity consisting of a dispersion of hollow glass spheres in an oxygen-curing silicone resin wherein said hollow glass spheres are between about 0.1% to about 40% by weight of the composition.

2. The composition of claim 1, wherein said hollow glass spheres are present in an amount from about 0.25% to about 20% by weight of the composition.

3. The composition of claim 1, wherein said hollow glass spheres are present in an amount from about 5% to about 30% by weight of the composition.

4. The composition of claim 1, wherein said hollow glass spheres have a diameter from about 5 μm to about 30 μm.

5. An article comprising at least a portion of a surface coated with the composition of claim 1.

6. The article of claim 5, wherein the surface comprises a material selected from the group consisting of metal, thermoplastics, thermoplastic composites, polyethylene, wood, stone, ceramics, glass, masonry materials, and combinations thereof.

7. The article of claim 5, wherein said article is selected from the group consisting of steel ammunition boxes, railroad ties, plastic piping, lumber, sheet piling, boat hulls, pick-up truck beds, gasoline canisters, fuel tanks in automobiles, airplanes, ships, and submarines, steel skyscraper structures, bridges, areas near high temperature operating components, infrastructure, building support structures, cables in suspension bridges, and high-pressure storage tanks.

8. A method for coating an article with a flame or heat flux protective coating layer comprising applying the composition of claim 1 to at least a portion of said article.

9. The composition of claim 1, wherein the resin optionally comprises a solvent.

10. The composition of claim 9, wherein the solvent is polyurethane.

* * * * *